(12) United States Patent
Schloesser et al.

(10) Patent No.: US 10,068,267 B1
(45) Date of Patent: Sep. 4, 2018

(54) PROGRAMMATIC SELECTION OF SERVICE PROVIDER

(71) Applicant: Amazon Technologies, Inc., Seattle, WA (US)

(72) Inventors: Tyler Matthew Schloesser, Seattle, WA (US); Vamsi Moudgalya Koppunur, Bellevue, WA (US); Chandra Shekar Neti, Bellevue, WA (US); Branon Jeffrey Lyle, Seattle, WA (US); Yaodong Liu, Bellevue, WA (US); Anita Anil Borkar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 159 days.

(21) Appl. No.: 14/846,466

(22) Filed: Sep. 4, 2015

(51) Int. Cl.
*G06F 17/20* (2006.01)
*G06F 17/28* (2006.01)
*G06Q 30/06* (2012.01)

(52) U.S. Cl.
CPC ............ *G06Q 30/06* (2013.01); *G06F 17/28* (2013.01)

(58) Field of Classification Search
CPC ... G06Q 30/06; G06F 17/289; G06F 17/2872; G06F 27/2827; G06F 17/2735
USPC .............................................. 704/2, 4, 7, 270
See application file for complete search history.

(56) References Cited

U.S. PATENT DOCUMENTS

| | | | |
|---|---|---|---|
| 8,260,266 B1 * | 9/2012 | Amidon | H04M 3/42348 455/414.1 |
| 2012/0179448 A1 * | 7/2012 | Gupta | H04W 4/028 704/2 |
| 2014/0303956 A1 * | 10/2014 | Wilson | G06Q 10/06 704/2 |

* cited by examiner

*Primary Examiner* — Thierry L Pham
(74) *Attorney, Agent, or Firm* — Eversheds Sutherland (US) LLP

(57) ABSTRACT

Systems, methods, and computer-readable media are disclosed for determining a recommendation for a service provider to perform a service on a creative work based on metadata associated with the creative work and attribute information associated with the service provider. Systems, methods, and computer-readable media are also disclosed for determining a recommendation for a creative work requiring a service to be performed based on metadata associated with the creative work and attribute information associated with the service provider.

18 Claims, 7 Drawing Sheets

US 10,068,267 B1

PROGRAMMATIC SELECTION OF SERVICE PROVIDER

BACKGROUND

Online publishing service platforms may be utilized by authors to identify and connect with service providers that offer various services for creative works. However, as more authors and service providers utilize such platforms, it becomes increasingly difficult for an author and/or publisher to determine a service provider best suited for a particular creative work.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
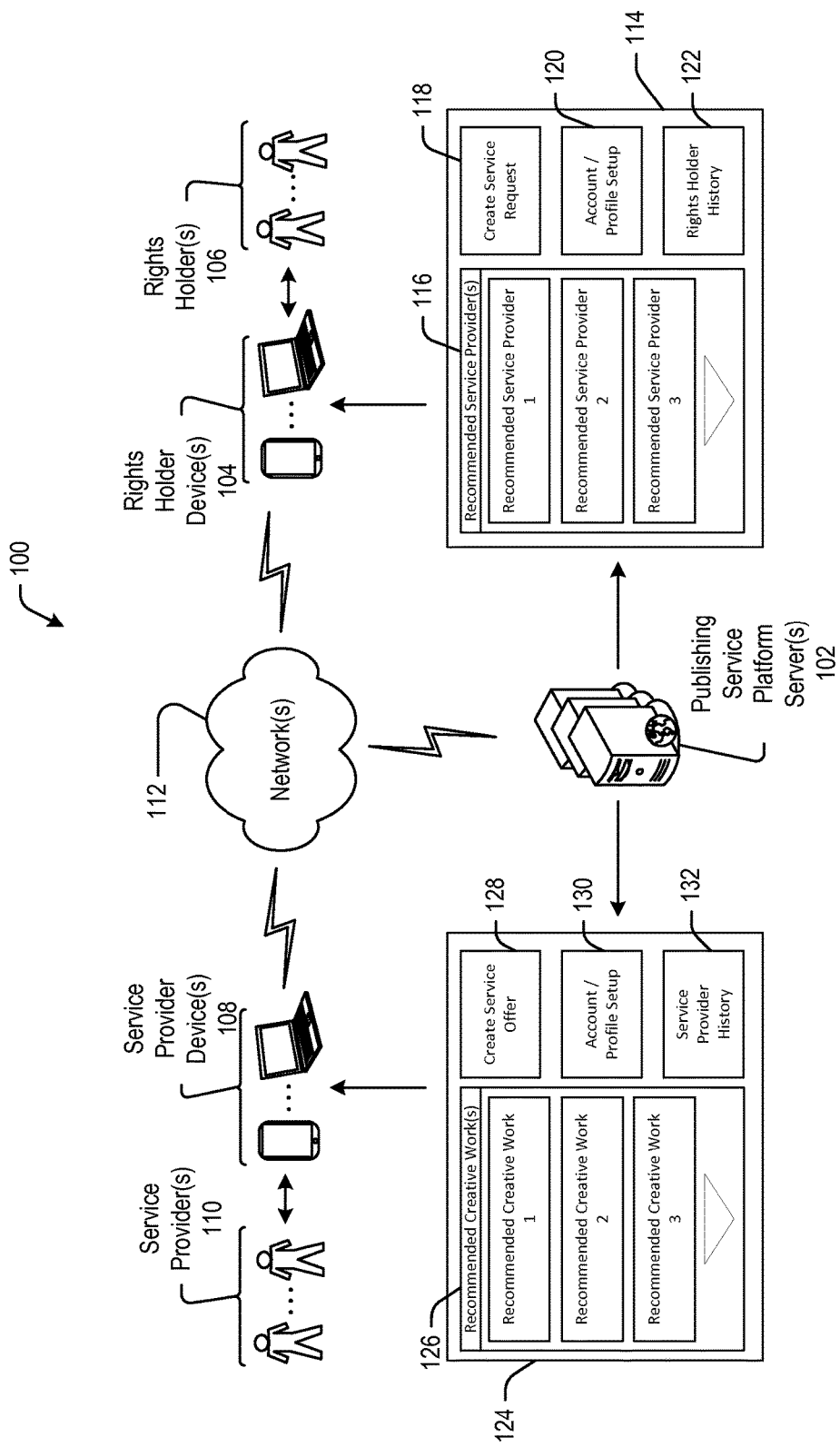
FIG. 1 is a schematic block diagram of an illustrative networked architecture in accordance with one or more example embodiments of the disclosure.

This disclosure relates to, among other things, systems, methods, computer-readable media, techniques, and methodologies for utilizing metadata and attribute information to identify candidate service providers for performing a service relating to a creative work of a rights holder. A rights holder of a creative work may utilize the systems, methods, computer-readable media, techniques, and/or methodologies disclosed herein to identify one or more service providers for performing the service to the creative work. Additionally and/or alternatively, metadata and attribute information may be utilized to identify creative works to recommend to a service provider as candidate works for receiving a service provided by the service provider. A service provider may utilize the systems, methods, computer-readable media, techniques, and/or methodologies disclosed herein to identify one or more creative works to which a service may be performed.

In accordance with an embodiment, a publishing service platform may be accessed and/or utilized by a rights holder and/or a service provider to facilitate generation of recommendations for service providers and/or creative works, respectively. In some embodiments, the publishing service platform may be associated with an online marketplace, an auction website, and/or the like. For example, the publishing service platform may be operatively communicated with an online marketplace that is responsible for facilitating the publishing, purchasing, selling, transferring, trading, and/or the like of creative works between users (e.g., rights holders and/or service providers) and/or customers, and therefore may have access to information (e.g., data, metadata, and/or the like) associated with one or more creative works, rights holders of creative works, service providers, and/or the like.

While example embodiments of the disclosure may be described in the context of creative works, it should be appreciated that embodiments of the disclosure are applicable to any type of written creative work and/or written material, which may include, but is not limited to, books, electronic books (e-books), electronic or written publications, articles, manuscripts, scripts, personal documents, text files, electronic and/or written communications (e.g., email, text messages, instant messages, letters, etc.), and/or other types of text-based content. Furthermore, it should be appreciated that embodiments of the disclosure may also be directed to creative works that are not text based, such as illustrations, photographs, data charts, and/or the like.

While example embodiments of the disclosure may be described in the context of publishing services, it should be appreciated that embodiments of the disclosure are applicable to any type of publishing service and/or action, which may include, but is not limited to, text translation services, text proofreading services, text editing services, illustration services, publishing services, legal and/or business services, and/or the like. Accordingly, service providers may refer to any type of individual, corporation, and/or group that provides one or more services. For example, service providers may include translators, proofreaders, editors, illustrators, publishers, lawyers, advisors, accountants, consultants, and/or the like.

Example embodiments of the disclosure may be described with reference to the rights holder of a creative work, which may include any type of holder and/or controller of any and/or all rights associated with the creative work(s), which may include, but is not limited to, an author, a publisher and/or publishing company, an agent, a manager, and/or the like. In certain embodiments, rights associated with a creative work include full or partial ownership rights, distribution rights, licensing rights, copyrights, trademarks, other intellectual property rights, and/or the like.

While example embodiments of the disclosure may be described in the context of metadata, it should be appreciated that embodiments of the disclosure are applicable to any type of data associated with a creative work that identifies and/or describes the creative work. In some embodiments, metadata may include, but is not limited to, an author name, a publisher name, a publication title, a publication date, a publication number, a desired service to be performed, a budget, location information (e.g., an Internet Protocol (IP) address of a device associated with a rights holder and/or a service provider, a global positioning system (GPS)-based location of a device associated with a rights holder and/or a service provider, and/or the like), historical information (e.g., information and/or metadata associated with one or more previously performed services and/or creative works), an email address, a street address, a zip code, a phone number of a rights holder associated with the creative work, a service request due date, a genre, a subgenre, a file size, a word count, an average word length, a page length, a source language, a target language, a rights holder rating score, and/or the like. Additionally, metadata may also include data associated with a previous creative work associated with a rights holder of the creative work, for example, a user account or user profile associated with the rights holder. Further, as used herein, metadata may refer to metadata and/or data associated with one or more users (e.g., a rights holder, a service provider), metadata and/or data associated with an online marketplace, and/or the like.

While example embodiments of the disclosure may be described in the context of attribute information, it should be appreciated that embodiments of the disclosure are applicable to any type of data associated with a user account or user profile (e.g., a user profile associated with a rights holder and/or a service provider). In some embodiments, attribute information may include, but is not limited to, an author name, a publisher name, a publication title, a publication date, a publication number, a desired service to be performed, a budget associated with performing a service, a budget range associated with performing a service, an Internet Protocol (IP) address of a device associated with a rights holder and/or a service provider, a global positioning system (GPS)-based location of a device associated with a rights holder and/or a service provider, an email address, a street address, a zip code, a phone number, a service request due date, a genre, a subgenre, a microgenre, a capacity of work, a file size, a word count, an average word length, a page length, a source language, a target language, a rights holder rating score, a service provider rating score, a customer review, data associated with a previous creative work, one or more user preferences, and/or the like.

In some embodiments, a user may utilize a user device (e.g., a computing device, a laptop computer, a desktop computer, an e-reader, a smartphone, a tablet, a wearable computing device, and/or any other type of electronic device) to access and/or utilize the publishing service platform. For example, the rights holder may, using a rights holder device, log into the publishing service platform to input information such as personal information (e.g., a name, contact information such as an email address, a street address, a zip code, and/or the like), payment information (e.g., an account number, a routing number, a bank card number, an expiration date, a security code, and/or the like), metadata associated with a creative work and/or previous creative works, user preferences, and/or the like. In some embodiments, this information may be retrieved automatically by the publishing service platform from an existing user account and/or a profile associated with an online marketplace, and/or the like. This information may be stored by a server associated with the publishing service platform and may be used to generate and/or update a user account and/or profile associated with the rights holder. Additionally and/or alternatively, a service provider may, using a service provider device, log into the publishing service platform to input information such as personal information (e.g., a name, contact information such as an email address, a street address, a zip code, and/or the like), payment information (e.g., an account number, a routing number, a bank card number, an expiration date, a security code, and/or the like), metadata associated with a creative work, user preferences, and/or the like. This information may be stored by a server associated with the publishing service platform and may be used to generate and/or update a user account and/or a profile associated with the service provider.

In some embodiments, information may be retrieved from an online marketplace associated with the publishing service platform. For example, information (e.g., metadata associated with a creative work, attribute information associated with a rights holder and/or a service provider, purchase, transaction, and/or payment information, customer review information, and/or the like) may be retrieved from a digital bibliography and/or bibliographical datastore associated with the rights holder. In some embodiments, the retrieved information may include ratings and/or reviews of the user (e.g., rights holder and/or service provider) provided to the online marketplace by third parties (e.g., previous parties with which the user has transacted, customers, and/or the like). For example, a consumer (e.g., a reader, a viewer, and/or the like) of a creative work may provide feedback, reviews, ratings, and/or the like regarding the creative work. Alternatively, a rights holder may provide feedback, reviews, ratings, and/or the like regarding a service provider that provided a service to a creative work of the rights holder. As another example, information associated with consumers of creative works such as demographic information, consumption information (e.g., information associated with a creative work, information associated with a rights holder, information associated with a service provider, information associated with a consumer of a creative work (e.g., demographic information, user profile information, location information, payment account information, and/or the like), rating information and/or reviews associated with a creative work, rating information and/or reviews associated with a rights holder, rating information and/or reviews associated with a service provider, a number of views, purchases, reads, clicks, searches, recommendations, and/or the like of a creative work, and/or the like), purchase information, and/or the like that may be retrieved and/or received by the service provider platform. As such, this rating information may be retrieved by the online marketplace and/or utilized by the publishing service platform.

According to one or more embodiments, a user profile of a user (e.g., a rights holder and/or a service provider) may be associated with the rights holder and/or the service provider. In some embodiments, a user profile of a user (e.g., a rights holder and/or a service provider) may include information, data, metadata associated with one or more creative works, ratings, reviews, feedback, and/or attribute information associated with a rights holder and/or a service provider as described herein.

In some embodiments, information included in a user profile associated with the rights holder may be used by the publishing service platform to generate a service request for a service (or multiple services) to be performed to a creative work associated with the rights holder. For example, a service request may include a request to translate text of a German romance novel set in the nineteenth century from German to English. In some embodiments, a service request may include metadata associated with a creative work such as a desired service to be performed to the creative work, a deadline and/or service due date, a budget, and/or other information that defines a scope of the service to be performed to the creative work. The service request may then be analyzed and/or processed by the publishing service platform.

Next, the publishing service platform may compare information associated with a service request (e.g., metadata associated with a creative work) and attribute information comprised in one or more user profiles associated with one or more service providers. Based on this comparison, the publishing service platform may determine one or more service providers to be recommended to the rights holder associated with the service request. For example, the publishing service platform may identify, based on a comparison of metadata and attribute information, one or more service providers who are fluent in both German and English and that have a positively-reviewed history of performing language translation services on novels of the romance genre. Alternatively, based on this comparison, the publishing service platform may determine one or more creative works to be recommended to the service provider for performing a service to the creative work(s). For example, the publishing service platform may identify, based on a comparison of metadata and attribute information, one or more romance novels that require a text translation from German to English. In some embodiments, the publishing service platform may determine at least a partial match between information associated with a service request and information included in a user profile of a service provider.

In some embodiments, the publishing service platform may identify a group of service providers that, based on attribute information associated with each service provider, are known to perform a particular type of service that is specified in a service request initiated by a rights holder. The group of service providers may be related, similar, and/or the like to one or more identified service providers determined to be best-matching. Alternatively, multiple service providers may be determined to be a complete (e.g., 100%) match and/or similarly-scored matches. If a perfect (e.g., 100%) match between metadata and attribute information is not determined, then the publishing service platform may determine a "fuzzy match," or a match that is a partial match. In some embodiments, fuzzy matching may include defining various types of rights holders and/or types of service providers, and then comparing metadata and attribute information associated with those types. For example, attribute information of one or more service providers known to perform translation services may be compared with the metadata of a rights holder (and/or an associated creative work) who desires a translation service for a creative work.

In this manner, the publishing service platform may be enabled to identify one or more pieces of metadata and/or attribute information that can be modified to alter a number of identified service providers and/or creative works. This may enable the publishing service platform to automatically broaden and/or narrow a returned (e.g., identified) set of service providers that are to be recommended to a rights holder for performing a service to a creative work of the rights holder.

For example, assume ten service providers have been identified as complete (e.g., 100%) matches for a rights holder based on a comparison of metadata of a creative work (associated with a service request, a rights holder, and/or the like) and attribute information of service providers. In order to narrow the results further and provide the rights holder with a smaller, more manageable number of service providers, the publishing service platform may identify one or more pieces of metadata and/or one or more pieces of attribute information to be included and/or excluded in a subsequent comparison of metadata and attribute information. Continuing with the example, if ten service providers were identified, but location information was not specified in a service request, then location information may be identified as a piece of metadata and/or attribute information by which the set of ten identified service providers may be reduced. Accordingly, the publishing service platform may again perform a comparison of metadata associated with the creative work and attribute information associated with the service providers. As such, the ten identified service providers may now be evaluated based on location information. For example, the three service providers nearest a location of the rights holder may be identified and then included in a second, more precise (e.g., geographically targeted) set of service providers to be recommended to the rights holder for performing the desired service to the creative work.

A similar technique may be utilized for broadening a set of identified service providers. For example, assume only one service provider was identified as a partial match of 50% based on a comparison of metadata and attribute information. To identify more service providers that are potentially relevant to the rights holder, the publishing service platform may identify one or more pieces of metadata and/or one or more pieces of attribute information that were included in the comparison of metadata and attribute information but has a particularly limiting effect. For example, the publishing service platform may identify a piece of metadata such as a due date for completion of a desired service that was unrealistic. The publishing service platform may then exclude and/or modify the piece of metadata, such as extending a due date to a later date, in a second comparison of metadata and attribute information to increase the chances of identifying one or more service providers that are available in the larger window of time. The publishing service platform may identify various pieces of metadata and/or attribute information to be included, excluded, and/or modified in a subsequent comparison of metadata and attribute information. For example, rating information, purchase history information, information associated with previously-performed services and/or other creative works, and/or the like may be identified, included, excluded, and/or modified in a subsequent comparison.

Further, one or more predetermined threshold values (e.g., maximums, minimums, integer counts, and/or the like) may be defined for determining whether the publishing service platform is to identify one or more pieces of metadata and/or attribute information to include, exclude, and/or modify in a subsequent comparison. For example, if a number of service providers included in a group of identified service providers meets or exceeds a predetermined maximum threshold, then the publishing service platform may identify one or more pieces of metadata and/or attribute information to include and/or modify in a subsequent comparison of metadata and attribute information so that the number of service providers included in a group of identified service providers is reduced. Conversely, if a number of service providers included in a group of identified service providers falls below a predetermined minimum threshold, then the publishing service platform may identify one or more pieces of metadata and/or attribute information to exclude and/or modify in a subsequent comparison of metadata and attribute information so that the number of service providers included in a group of identified service providers is increased. In some embodiments, the piece(s) of metadata and/or attribute information identified by the publishing service platform for inclusion, exclusion, and/or modification in a subsequent comparison may be based on rankings and/or weights of pieces of metadata and/or preferences.

The publishing service platform may then filter, sort, rank, and/or order the group of service providers based on how closely attribute information associated with each service provider matches information included in the service request (e.g., metadata associated with a creative work and/or a service). The publishing service platform may recommend all identified service providers or a portion of the group of identified service providers to the rights holder. For example, the publishing service platform may identify a group of ten service providers based on determining at least a partial match between information associated with the service request and attribute information of each service provider, filter the group of ten service providers based on relevance, and then recommend three best-matching service providers to the rights holder.

The publishing service platform may filter, sort, rank, order, and/or the like the group of service providers based on how closely attribute information associated with each service provider matches information included in the service request (e.g., metadata associated with a creative work and/or a service). For example, assuming a requested service is for performing a German-to-English language translation of a romance novel, a first service provider who has a history of performing highly-rated translations of romance novels from German to English may be recommended and/or ranked before a second service provider who has a history of performing highly-rated translations of fantasy novels from German to English (and/or a third service provider who has a history of performing highly-rated translations of thriller novels from German to Dutch) because the first service provider more closely matches information provided in the service request when compared to the second service provider (and/or the third service provider). The publishing service platform may recommend all identified service providers or a portion of the group of identified service providers to the rights holder. For example, the publishing service platform may identify ten service providers based on determining at least a partial match between information associated with the service request and attribute information of each service provider, and recommend three best-matching service providers to the rights holder.

In another example, the publishing service platform may identify a group of creative works that, based on metadata associated with each creative work and/or information associated with corresponding service requests, are determined to require a particular type of service specified in a service request that is known to be performed by the service provider based on attribute information. The publishing service platform may then filter, sort, rank, and/or order the group of creative works based on how closely attribute information associated with the service provider matches information included in the service request (e.g., metadata associated with a creative work and/or a service). The publishing service platform may recommend all identified creative works or a portion of the group of identified creative works to the service provider. For example, the publishing service platform may identify a group of ten creative works that require a service of a particular service type based on determining at least a partial match between information associated with the service request (e.g., metadata associated with each creative work) and attribute information associated with the service provider, filter the group of ten creative works based on relevance, and recommend three best-matching creative works to the service provider.

In some embodiments, groups of identified service providers and/or creative works may be filtered, sorted, ranked, and/or ordered based on how well attribute information associated with the service provider and/or rights holder matches information included in the service request (e.g., metadata associated with a creative work and/or a service). For example, a rights holder may rank a list of metadata, information, and/or the like associated with a service request when initiating a service request for a service. More particularly, the rights holder may indicate that using a service provider who is fluent in both German and English is of a higher importance than using a service provider who is highly rated in performing text translations for a particular genre (e.g., romance, thriller, and/or the like). As such, the rights holder may rank a language fluency preference higher than a genre preference when initiating a service request. As an alternate example, a service provider's ability to complete a service by a deadline specified in a service request may be of higher priority to a rights holder than past work experience of a service provider.

In other embodiments, various pieces of information (e.g., metadata and/or attribute information) may be weighted by a respective user (e.g., a rights holder and/or a service provider). For example, a rights holder may wish to work with service providers within a predetermined geographic area (e.g., a nearby zip code) so that they may meet in person to discuss details of the service request, and therefore may initiate a service request for a local service. As another example, a rights holder may wish to work with service providers who have documented and highly-rated experiences working with a particular genre of creative works. Therefore, the rights holder may more heavily weight previous work experience and/or positive customer reviews when initiating a service request. As yet another example, a service provider may specify in his preferences that he wants to perform translation services from a particular source language to a particular target language. Therefore, these preferences may be ranked higher and/or weighted more heavily to ensure that the service provider receives recommendations that closely match his demands. For instance, if the service request indicates a hard deadline (e.g., due date) of a service to be provided to a creative work, then the due date may be weighted more heavily than a genre preference. In some embodiments, the user may be enabled to define a threshold value (e.g., a limit) for one or more pieces of information (e.g., metadata and/or attribute information) within which the publishing service platform must operate. For example, a rights holder may specify in a service request a distance within which service providers must be located in order to be identified as at least partial matches. Accordingly, the publishing service platform may filter potential service providers (and/or creative works) that meet and/or exceed a predetermined threshold.

In some embodiments, a score may be calculated for each service provider and/or creative work. The score may be calculated by the publishing service platform based at least in part on determining at least a partial match between one or more pieces of information (e.g., metadata) associated with a creative work and/or a rights holder and attribute information associated with a service and/or a service provider. In some embodiments, the score may correspond to a relevance of the service provider to a rights holder and/or a creative work to a service provider. For example, a first service provider who can perform a service to a creative work within a predetermined due date outlined in a service request may receive a higher score than a second service provider who can perform the service to the creative work outside the predetermined due date. The score may further be calculated based on weighted pieces of information so that preferences of the rights holder are considered according to their respective importance to the rights holder. In some embodiments, a number of pieces of information (e.g., metadata and/or attribute information) matched and/or weights of matched pieces of information may contribute to the calculated score.

In this manner, service providers may be recommended to a rights holder based on the publishing service platform determining that a score associated with each service provider meets or exceeds a predetermined threshold value of scores. For example, only service providers that receive a 90% information matching (e.g., relevance) score may be recommended to the rights holder. In some embodiments, this predetermined threshold value may be set and/or modified by the rights holder.

Similarly, creative works may be recommended to a service provider based on the publishing service platform determining that a score associated with each creative work meets or exceeds a predetermined threshold value of scores. For example, only creative works that receive a 90% information matching (e.g., relevance) score may be recommended to the service provider. In some embodiments, this predetermined threshold value may be set and/or modified by the service provider.

The publishing service platform may further be configured to determine, based on processing a service request, which pieces of information (e.g., metadata, attribute information, and/or the like) are critical (e.g., most relevant and/or relevant) to a rights holder and/or a service provider. For example, the publishing service platform may determine a piece of metadata associated with a creative work to be critical to a corresponding rights holder based on a weight, a ranking, a location in an order of information (e.g., pieces of metadata and/or attribute information), and/or the like.

In some embodiments, the publishing service platform may further be configured to determine a location of a rights holder and/or a service provider. In some embodiments, the publishing service platform may detect an IP address and/or GPS coordinates of a user (e.g., a rights holder and/or a service provider) using login information associated with the user and/or other information. Based on the determined location of a user, the publishing service platform may determine a region (e.g., a country, a zip code, a city, a market, and/or the like) in which the rights holder and/or the service provider is located. The publishing service platform may then identify one or more attributes (e.g., languages, dialects, and/or the like) associated with the region. The publishing service platform may also determine a distance between the determined location of the rights holder and the determined location(s) of one or more service providers, and vice versa. In this manner, the publishing service platform may determine that the rights holder is within a predetermined proximity to the one or more service providers, which may confirm that the rights holder is within a relevant location to one or more service providers.

In some embodiments, the publishing service platform may determine an amount of time required for a service provider to perform a service to a creative work. This determination may be based at least in part on metadata associated with the creative work, attribute information of the service provider, an analysis of content of the creative work, and/or previously-performed services of a similar type, size, scope, and/or the like. For example, the publishing service platform may determine that a particular language translation service of one-hundred words requires five hours to perform. The attribute information of the service provider may include an availability and/or schedule of the service provider to perform the service, and a service provider availability may be processed by the publishing service platform in conjunction with a service due date specified in a service request. For example, if a first service provider has no availability to perform a service during a first week in which the service is due, the publishing service platform may determine that it may take at least one week for the service to be performed. Conversely, if a second service provider has full availability the first week, the publishing service platform may determine that it may take less than one week for the service to be performed. As such, the second service provider may be recommended to a rights holder over (or before) the first service provider. Therefore, a determination of an amount of time required for a service provider to perform a service to a creative work may affect the publishing service platform's recommendation of service providers to the rights holder.

Similarly, the publishing service platform may determine that performing a service to a creative work may require a predetermined amount of time. Based on an availability of a service provider, the publishing service platform may recommend one or more creative works. For example, if a first creative work requires a service that requires forty hours with a deadline of five days, a second creative work requires a service that requires twenty hours with a deadline of five days, and the service provider only has three days of availability during a first week, then the publishing service platform may recommend the second creative work over (or before) recommending the first creative work during the first week.

The publishing service platform may determine an amount of time required for performing a service to a creative work by analyzing information associated with a service request, including but not limited to metadata associated with the creative work, attribute information of the rights holder and/or the service provider, a service type, a scope of the service, and/or the like. For example, the publishing service platform may determine that, based on a length of a document, a word count, an average word length, and/or the like, that performing a service may require X number of hours.

In some embodiments, historical data may be utilized in determining an amount of time required for performing a service to a creative work and/or determining at least a partial match between information associated with a service request and attribute information associated with a service provider. For example, the publishing service platform may retrieve and utilize information associated with one or more previously-performed services to similar creative works (e.g., creative works of a similar genre, subgenre, services of similar service types, and/or the like). In this manner, the publishing service platform may more accurately assess a service provider's ability to perform a service to a creative work. For example, if a service provider has received high-satisfaction reviews from customers for performing previous services, then the publishing service platform may recommend the service provider to a rights holder for performing a service similar to the previously-performed services.

Processing the service request may further include the publishing service platform analyzing content associated with the creative work. For example, the publishing service platform may analyze text, an image, a video, and/or the like of the creative work. In this manner, the publishing service platform may be enabled to determine a word count, an average word length, and/or other attributes (e.g., metadata) associated with the creative work. For example, based on an analysis of content of the creative work, the publishing service platform may determine a language of origin, may identify one or more spelling errors, and/or the like.

Further, analyzing content of the creative work may enable the publishing service platform to identify one or more services that can be performed to the creative work. For example, if the publishing service platform analyzes text of a creative work and identifies many spelling errors, then the publishing service platform may determine one or more service providers to be recommended to the rights holder of the creative work for proofreading and/or text editing services. Additionally, the publishing service platform may analyze content of a creative work to determine and/or identify information and/or metadata associated with the creative work such as a genre, a subgenre, and/or the like. For example, the publishing service platform may search for and identify one or more keywords associated with a particular subgenre (e.g., mythical fantasy) in the text of the creative work. Based at least in part on identifying one or more keywords, the publishing service platform may determine a subgenre of the creative work. In some embodiments, all content of a creative work may be analyzed, while in other embodiments, only a portion of the creative work may be analyzed by the publishing service platform. Further, the publishing service platform may be enabled to determine a complexity (e.g., difficulty level) of a desired service to be performed. For example, if there are more identified misspellings in a first creative work than a second creative work, then it may be determined that editing the first creative work is more difficult than editing the second creative work and therefore may require more time, more budget, and/or the like to perform an editing service.

Once the publishing service platform determines one or more service providers to recommend to the rights holder (or determines one or more creative works to recommend to the service provider), the publishing service platform may generate a recommendation. In some embodiments, the recommendation may be included in an email, a message, a push notification, an alert, and/or the like, which may be transmitted to a device associated with the rights holder via one or more networks for selection. The recommendation may also include a visual presentation of one or more recommended service providers and/or creative works via a dashboard associated with the publishing service platform and/or an online marketplace. The recommended service providers and/or creative works may be presented in a list, a grid, and/or the like that is sorted, ranked, ordered, and/or the like based on relevance to the rights holder and/or the service provider, respectively. For example, service providers with the highest score (e.g., best-matching) may be presented to the rights holder first or in a first position in a list. Further, a recommendation may include an estimate of time required to perform a desired service to the creative work(s), an availability of a service provider, a rating associated with a rights holder and/or a service provider, and/or the like. The recommendation may also include justifications for why each service provider and/or creative work was determined to be recommended. The recommendation may further include means for enabling a user (e.g., a rights holder and/or a service provider) to provide feedback associated with the provided recommendations. For example, a service provider may be enabled to provide, via a user interface, input that specifies why the service provider chooses to select and/or to not select a recommended creative work. In this manner, the publishing service platform may update a user profile associated with the service provider and/or attribute information associated with the service provider based on feedback received from the service provider). The recommendation typically includes means for enabling a user (e.g., a rights holder and/or a service provider) to select one or more recommendations (e.g., a recommended service provider and/or a recommended creative work).

Upon selection of a recommendation, the publishing service platform may initiate a communication link between the user (e.g., the rights holder and/or the service provider) and a selected recommendation (e.g., a selected recommended service provider and/or a selected recommended creative work). For example, the publishing service platform may initiate a chat window, a conversation stream, a videoconferencing stream, a teleconferencing stream, and/or the like between a device associated with a rights holder and a device associated with a selected recommended service provider. The two parties may then be enabled to communicate regarding how to perform the service, explain additional details of the service, and/or the like.

Further, a transaction process associated with performing the service may be initiated and/or facilitated by the publishing service platform. For example, the publishing service platform may request payment information from the rights holder. In some embodiments, the publishing service platform may generate and/or transmit an invoice prior to establishing a communication link between a rights holder and a service provider. In some embodiments, the publishing service platform may also determine a currency associated with each of the rights holder and the service provider based on determining a respective location of the rights holder and the service provider. In this manner, the publishing service platform may facilitate the conversion of one or more currencies so as to ensure a seamless payment process.

Illustrative System Architecture

FIG. 1 is a schematic block diagram depicting an illustrative networked architecture 100 in accordance with one or more example embodiments of the disclosure. The architecture 100 may include one or more publishing service platform servers 102, one or more rights holder devices 104 operable by one or more rights holders 106, and one or more service provider devices 108 operable by one or more service providers 110. The one or more publishing service platform servers 102, rights holder devices 104, and service provider devices 108 may be operably and/or communicatively coupled with one another via one or more networks 112.

As described herein, the publishing service platform server(s) 102 may include any suitable computing device including, without limitation, a server computer, a mainframe computer, a workstation, a desktop computer, a laptop computer, and so forth. The rights holder device(s) 104 and/or the service provider device(s) 108 may include any suitable user device including, without limitation, a smartphone or other cellular device, a tablet device, an electronic reader device, a desktop computing device, a laptop computing device, a gaming console, a multimedia content streaming device, a television such as a Smart TV, or any other device capable of receiving content (e.g., web content) over one or more networks and rendering the content for presentation to a user. While various illustrative components of the architecture 100 may be described herein in the singular, it should be appreciated that multiple ones of any such components may be provided in various example embodiments of the disclosure.

The publishing service platform server 102, the rights holder device(s) 104, and/or the service provider device(s) 108 may each be configured to communicate with one or more entities of the architecture 100 via one or more networks 112. The network(s) 112 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 112 may have any suitable communication range associated therewith and may include, for example, global networks (e.g., the Internet), metropolitan area networks (MANs), wide area networks (WANs), local area networks (LANs), or personal area networks (PANs). In addition, the network(s) 112 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

An illustrative user interface 114 is depicted in FIG. 1 as being rendered on a rights holder device 104. The user interface 114 may be rendered, for example, by an application executing on the rights holder device 104 (e.g., publishing service platform application 254 of FIG. 2). The user interface 114 may, for example, provide a view of one or more recommended service providers 116. The user interface 114 may also enable the rights holder(s) 106 to select one or more recommended service providers, initiate and/or execute a transaction associated with a selected recommended service provider 116 for performing a service, and/or the like. The user interface 114 may further facilitate the input, presentation, modification, and/or validation of information associated with a service request, a creative work (e.g., metadata), personal information (e.g., a user profile), attribute information, and/or the like. Attribute information (user profiles, preferences, and/or the like) associated with recommended service providers 116 may be stored on the rights holder device 104, the publishing service platform server(s) 102, and/or any other storage location. The user interface 114 may further enable the rights holder 106 to create, modify, manage, and/or edit a service request 118 by inputting information (e.g., metadata) associated with a creative work and/or a desired service to be performed to the creative work (see exemplary user interface 300 of FIG. 3). The user interface 114 may further enable the rights holder 106 to view, create, modify, manage, and/or set up a user account and/or profile 120. Additionally, a history 122 of the rights holder 106 including past service requests, reviews and/or ratings associated with the rights holder 106 and/or a creative work of the rights holder 106, consumption information, and/or the like may be accessible by the rights holder 106 via the user interface 114.

An illustrative user interface 124 is depicted in FIG. 1 as being rendered on a service provider device 108. The user interface 124 may be rendered, for example, by an application executing on the service provider device 108 (e.g., publishing service platform application 268 of FIG. 2). The user interface 124 may, for example, provide a view of one or more recommended creative works 126. The user interface 124 may also enable the service providers(s) 110 to select one or more recommended creative works, initiate and/or execute a transaction associated with a selected recommended creative work 126 for performing a service, and/or the like. The user interface 124 may further facilitate the input, presentation, modification, and/or validation of information associated with a service request, a creative work (e.g., metadata), personal information (e.g., a user profile), attribute information, and/or the like. Attribute information (user profiles, preferences, and/or the like) associated with recommended creative works 126 (e.g., metadata) may be stored on the service provider device(s) 108, the publishing service platform server(s) 102, and/or any other storage location. The user interface 124 may further enable the service provider 110 to create, modify, manage, and/or edit a service offer (e.g., an offer to perform one or more services to one or more creative works) 128 by inputting information (e.g., metadata) associated with an offered service and/or a desired type of creative work to which a service may be performed (see exemplary user interface 400 of FIG. 4). The user interface 124 may further enable the service provider 110 to view, create, modify, manage, and/or set up a user account and/or profile 130. Additionally, a history 132 of the service provider 110 including information associated with past service requests, reviews and/or ratings associated with the service provider 110 and/or services previously performed by the service provider 110, consumption information, and/or the like may be accessible by the service provider 110 via the user interface 124.

The information described herein may also be transmitted, received, retrieved, stored, recalled, accessed, and/or the like by the publishing service platform server(s) 102, the rights holder device(s) 104, the service provider device(s) 108, and/or the like. In some embodiments, the publishing service platform server(s) 102, the rights holder device(s) 104, and/or the service provider device(s) 108 may further be enabled to communicate and/or transfer information with other systems and/or devices not pictured in FIG. 1. For example, the publishing service platform server(s) 102 may be in operative communication with one or more online marketplace server(s) (not pictured) and may be enabled to retrieve and/or access information as instructed by exemplary embodiments of the disclosure described herein.

Figure 2:
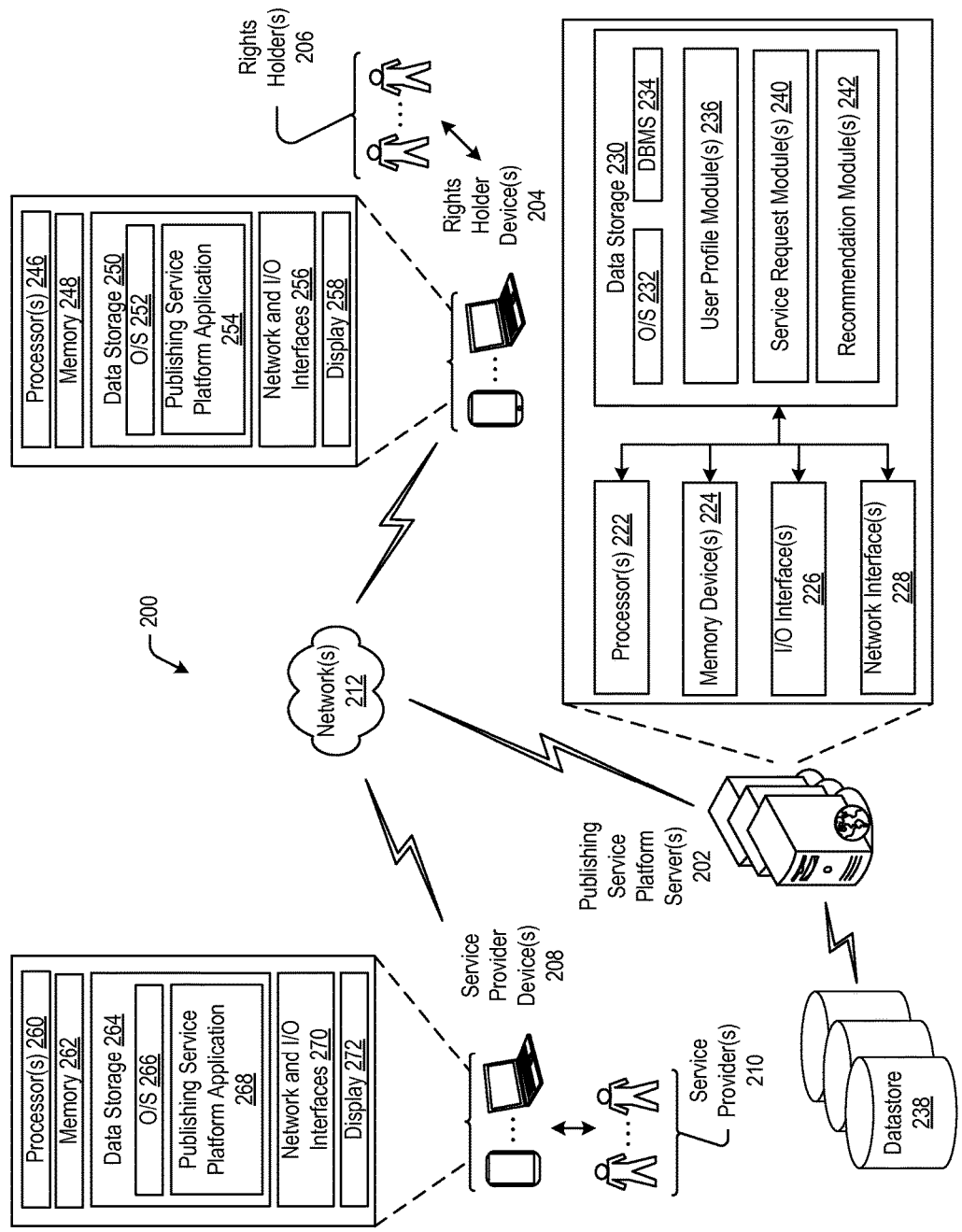
FIG. 2 is a more detailed schematic block diagram of an illustrative system architecture in accordance with one or more example embodiments of the disclosure.

FIG. 2 is a more detailed schematic block diagram of an illustrative system architecture 200 in accordance with one or more example embodiments of the disclosure. In certain example embodiments, the architecture 200 may represent a particular implementation or configuration of the architecture 100. For example, the publishing service platform server 202 may represent a particular implementation or configuration of the publishing service platform server 102 in accordance with one or more example embodiments of the disclosure. Further, the network(s) 212 may include any of the types of networks described through reference to the network(s) 112. It should be appreciated that FIG. 2 depicts merely example architectural and device configurations and that numerous modifications, variations, or the like are within the scope of this disclosure. Although certain elements in the following description may be described in the singular for purposes of clarity, it will be appreciated that such descriptions also apply to elements in the plural.

In an illustrative configuration, the publishing service platform server 202 may include one or more processors 222, one or more memory devices 224 (generically referred to herein as memory 224), one or more input/output ("I/O") interface(s) 226, one or more network interface(s) 228, and data storage 230. The publishing service platform server 202 may also be in communication with one or more rights holder devices 204 (hereinafter referred to in the singular). The rights holder device 204 may include one or more processors 246, a memory device 248, data storage 250, which may store an operating system (O/S) 252 and a publishing service platform application 254, network and I/O interfaces 256, and a display 258. The publishing service platform server 202 and/or the rights holder device 204 may also be in communication with one or more service provider devices 208 (hereinafter referred to in the singular). The service provider device 208 may include one or more processors 260, a memory device 262, data storage 264, which may store an O/S 266 and a publishing service platform application 268, network and I/O interfaces 270, and a display 272. These various components will be described in more detail hereinafter.

Referring back to the publishing service platform server 202, the memory 224 may include volatile memory (memory that maintains its state when supplied with power) such as random access memory (RAM) and/or non-volatile memory (memory that maintains its state even when not supplied with power) such as read-only memory (ROM), flash memory, and so forth. In various implementations, the memory 224 may include multiple different types of memory, such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 224 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 230 may include removable storage and/or non-removable storage including, but not limited to, magnetic storage, optical disk storage, and/or tape storage. The data storage 230 may provide non-volatile storage of computer-executable instructions and other data. The data storage 230 may include storage that is internal and/or external to the publishing service platform server 202. The memory 224 and the data storage 230, removable and/or non-removable, are examples of computer-readable storage media (CRSM) as that term is used herein.

The data storage 230 may store computer-executable instructions that are loadable into the memory 224 and executable by the processor(s) 222 to cause various operations to be performed. The data storage 230 may additionally store data that may be copied to memory 224 for use by the processor(s) 222 during the execution of the computer-executable instructions. Moreover, output data generated as a result of execution of the computer-executable instructions by the processor(s) 222 may be stored initially in memory 224, and may ultimately be copied to data storage 230 for non-volatile storage.

More specifically, the data storage 230 may store one or more operating systems (O/S) 232; one or more database management systems (DBMS) 234; and one or more program modules, applications, or the like such as, for example, one or more user profile modules 236, one or more service request modules 240, one or more recommendation module(s) 242, and so forth. These modules, while individually disclosed, may be interchangeable with one another. In some embodiments, each method and/or process disclosed herein may be executed by one or more modules.

The user profile module(s) 236 may include computer-executable instructions that, responsive to execution by one or more of the processor(s) 222, may cause operations to be performed for retrieving, transmitting, and/or storing information associated with a user profile of a rights holder 206 and/or a service provider 210 (e.g., metadata, attribute information, personal information, historical information, and/or the like). For example, the user profile module(s) 236 may include computer-executable instructions that, responsive to execution by one or more of the processor(s) 222, may cause operations to be performed for prompting the rights holder 206 and/or the service provider 210 via the rights holder device 204 and/or the service provider device 208, respectively, for inputting personal information. Once received and/or retrieved, this information may be utilized by the user profile module(s) 236, which may further include computer-executable instructions that, responsive to execution by one or more of the processor(s) 222, may cause operations to be performed for generating and/or modifying a user profile of the rights holder 206 and/or the service provider 210.

Additionally, user information such as information associated with a user profile (e.g., metadata, attribute information, personal information, historical information, and/or the like) may be stored in a datastore 238 associated with the online marketplace. Other information may also be stored in the datastore 238 such as consumption information, information associated with one or more creative works, content associated with a creative work, rating information, location information, and/or the like. The information may be stored locally and/or remotely to the publishing service platform server(s) 202. Therefore, the user profile module(s) 236, the service request module(s) 240, the recommendation module(s) 242, and/or any other component of the publishing service platform may access and/or retrieve this information from the datastore 238, communicate with the datastore 238, and/or the like. Referring now to other illustrative components of the publishing service platform server 202, the service request module(s) 240 may include computer-executable instructions that, responsive to execution by one or more of the processor(s) 222, may cause the generation of one or more service requests. For example, the service request module(s) 240 may enable the rights holder 206 to provide, using the rights holder device 204, information associated with a desired service to be performed to a creative work (see user interface 300 of FIG. 3). Information associated with a desired service to be performed and/or a service request may include metadata associated with a creative work, attribute information and/or information associated with a user profile of the service provider 210 and/or the rights holder 206, location information, historical information, and/or the like. Therefore, the service request module(s) 240 may include computer-executable instructions that, responsive to execution by one or more of the processor(s) 222, may cause operations to be performed for receiving, retrieving, transmitting, and/or storing such information from the rights holder device 204, the service provider device 208, an online marketplace server, one or more other modules of the publishing service platform servers 202 disclosed herein, and/or any other source. Additionally, the service request module(s) 240 may enable the service provider 210 to provide, using the service provider device 208, information associated with a service to be performed to a creative work (see user interface 400 of FIG. 4). For example, the service provider 210 may generate, by the service request module 240, a request (e.g., a creative work request) for one or more creative works in need of a service capable of being performed by the service provider 210. Information associated with a service to be performed and/or a creative work request may include metadata associated with a creative work, attribute information and/or information associated with a user profile of the service provider 210 and/or the rights holder 206, location information, historical information, and/or the like. Therefore, the service request module(s) 240 may include computer-executable instructions that, responsive to execution by one or more of the processor(s) 222, may cause operations to be performed for receiving, retrieving, transmitting, and/or storing such information from the service provider device 208, the rights holder device 204, an online marketplace server, one or more other modules of the publishing service platform servers 202 disclosed herein, and/or any other source. In some embodiments, the service request module(s) 240 may transmit a received service request to the recommendation module(s) 242 after processing the service request and/or for processing the service request.

Referring now to other illustrative components of the publishing service platform server 202, the recommendation module(s) 242 may include computer-executable instructions that, responsive to execution by one or more of the processor(s) 222, may cause the determination of one or more recommended service providers for performing a service to a creative work. For example, the recommendation module(s) 242 may process and/or analyze information and/or metadata associated with a creative work, information included in a user profile and/or attribute information associated with the rights holder 206 and/or the service provider 210, location information, information associated with a service request and/or a creative work request, historical information, and/or the like. In some embodiments, processing such information includes determining at least a partial match between metadata associated with a creative work and attribute information of the service provider 210 based on a comparison of such information. In some embodiments, processing such information includes determining, based on at least a partial match between the metadata and attribute information, the service provider 210 is to be recommended to the rights holder 206 to perform the service to the creative work.

Referring now to other illustrative program modules of the publishing service platform server 202, the recommendation module(s) 242 may include computer-executable instructions that, responsive to execution by one or more of the processor(s) 222, may cause the determination of a location of the rights holder device 204 and/or the service provider device 208. For example, the recommendation module(s) 242 may be configured to identify an IP address of the rights holder device 204 and/or the service provider device 208. Additionally, the recommendation module(s) 242 may be configured to identify GPS coordinates associated with the rights holder device 204 and/or the service provider device 208. Further, the recommendation module(s) 242 may include computer-executable instructions that, responsive to execution by one or more of the processor(s) 222, may cause operations to be performed for receiving, retrieving, transmitting, and/or storing location information (e.g., an IP address, GPS coordinates, a street address, a zip code, and/or the like) from the rights holder device 204, the service provider device 208, a server associated with an online marketplace, and/or any other information source. This information may be utilized by the recommendation module(s) 242 to determine a location, a region, a country, a zip code, a street address, GPS coordinates, and/or the like associated with the rights holder device 204 and/or the service provider device 208. The recommendation module(s) 242 may further determine a distance between the rights holder device 204 and the service provider device 208 and/or determine that the service provider device 208 is within a predetermined proximity to the rights holder device 204 (or vice versa) using the location information. The predetermined proximity may be defined and/or modified by the rights holder 206 and/or the service provider 210, an administrator associated with the publishing service platform server(s) 202, and/or another agent. In some embodiments, the predetermined proximity may be dynamic (e.g., based at least in part on a time of day, a season, a type of service, attribute information, preferences, metadata and/or information associated with a creative work, information included in a user profile, and/or the like).

Similarly, in some embodiments, the recommendation module(s) 242 may include computer-executable instructions that, responsive to execution by one or more of the processor(s) 222, may cause the determination of one or more recommended creative works for which a service is requested. For example, the recommendation module(s) 242 may process and/or analyze information and/or metadata associated with a creative work, information included in a user profile and/or attribute information associated with the rights holder 206 and/or the service provider 210, location information, information associated with a service request and/or a creative work request, historical information, and/or the like. In some embodiments, processing such information includes determining at least a partial match between metadata associated with a creative work and attribute information of the service provider 210 based on a comparison of such information. In some embodiments, processing such information includes determining, based on at least a partial match between the metadata and attribute information, a creative work associated with the rights holder 206 is to be recommended to the service provider 210 for performing the service to the creative work.

In some embodiments, processing such information includes determining the service provider 210 is to be recommended to the rights holder 206 for performing the service and/or the creative work is to be recommended to the service provider 210 based at least in part on determining the service provider 210 (e.g., the service provider device 208) is within a predetermined proximity to the rights holder 206 (e.g., the rights holder device 204). Further, processing such information may include determining an amount of time required for the service provider 210 to perform the service based at least in part on such information. For instance, if the service is translation of the creative work to a new language, then an amount of time for completion of the translation service may be determined by comparing, for example, the word count of the creative work with the word count of another creative work on which the service provider performed the same or similar service, for example, the translation from the same source language to the same new language.

The recommendation module(s) 242 may further be utilized to facilitate an analysis of content of a creative work. For example, the recommendation module(s) 242 may analyze text of a creative work to identify one or more predetermined keywords, images, patterns, misspellings, and/or the like, determine a subgenre of the creative work based on identifying one or more predetermined keywords included in the text of the creative work, determine a second service to be performed by the service provider, and/or the like. These identified and/or determined factors and/or information may be utilized by the recommendation module(s) 242 when determining recommendations.

For example, the recommendation module(s) 242 may identify a group of service providers 210 that, based on attribute information associated with each service provider 210, are known to perform a particular type of service specified in a service request that has been initiated by a rights holder 206. The recommendation module(s) 242 may then instruct the processor 222 to filter, sort, rank, and/or order the group of service providers 210 based on how closely attribute information associated with each service provider 210 match information included in the service request (e.g., metadata associated with a creative work and/or a service). Next, the recommendation module(s) 242 may recommend all identified service providers 210 or a portion of the group of identified service providers 210 to the rights holder 206. For example, the recommendation module(s) 242 may identify ten service providers 210 based on determining at least a partial match between information associated with the service request and attribute information of each service provider 210, and recommend three best-matching service providers 210 to the rights holder 206.

In another example, the recommendation module(s) 242 may utilize the processor 222 identify a group of creative works that, based on metadata associated with each creative work and/or information associated with corresponding service requests, are determined to require a particular type of service specified in a service request that is known to be performed by the service provider 210 based on attribute information. The recommendation module(s) 242 may facilitate filtering, sorting, ranking, and/or ordering the group of creative works based on how closely attribute information associated with the service provider 210 matches information included in the service request (e.g., metadata associated with a creative work and/or a service). The recommendation module(s) 242 may recommend all identified creative works or a portion of the group of identified creative works to the service provider 210. For example, the recommendation module(s) 242 may identify ten creative works that require a service of a particular service type based on determining at least a partial match between information associated with the service request (e.g., metadata associated with each creative work) and attribute information of the service provider 210, and recommend three best-matching creative works to the service provider 210.

In some embodiments, groups of identified service providers 210 and/or creative works may be filtered, sorted, ranked, and/or ordered based on how well attribute information associated with the service provider 210 and/or the rights holder 206 matches information included in the service request (e.g., metadata associated with a creative work and/or a service). For example, a rights holder 206 may rank a list of metadata, information, and/or the like associated with a service request when initiating a service request for a service. Additionally, filtering (e.g., sorting) of groups of identified service providers and/or creative works may be based on a calculation of scores associated with a relevance of each service provider and/or creative work to a rights holder and/or a service provider, respectively.

In other embodiments, various pieces of information (e.g., metadata and/or attribute information) may be weighted by a respective user (e.g., a rights holder 206 and/or a service provider 210). For example, a rights holder 206 may wish to work exclusively with service providers 210 within a predetermined geographic area (e.g., a nearby zip code), and may initiate a service request for a service accordingly. As another example, a rights holder 206 may wish to work with service providers 210 who have documented and highly-rated experiences working with a particular genre of creative works as demonstrated by historical data. Therefore, the rights holder 206 may more heavily weight previous work experience and/or positive customer reviews when initiating a service request. As yet another example, a service provider 210 may specify in his preferences that he wants to perform translation services from a particular source language to a particular target language. Therefore, these preferences may be ranked higher and/or weighted more heavily to ensure that the service provider 210 receives recommendations that closely match his demands.

In some embodiments, a score may be calculated for each service provider 210 and/or creative work. The score may be calculated by the recommendation module(s) 242 based at least in part on determining at least a partial match between one or more pieces of information (e.g., metadata) associated with a creative work and/or a rights holder 206 and attribute information associated with a service and/or a service provider 210. For example, a first service provider 210 who can perform a service to a creative work within a predetermined deadline outlined in a service request may receive a higher score than a second service provider 210 who can perform the service to the creative work outside the predetermined deadline.

In this manner, service providers 210 may be recommended to a rights holder 206 based on the recommendation module(s) 242 determining that a score associated with each service provider 210 meets or exceeds a predetermined threshold value of scores. For example, only service providers 210 who receive a 90% information matching (e.g., relevance) score may be recommended to the rights holder 206. In some embodiments, this predetermined threshold value may be set and/or modified by the rights holder 206.

Similarly, creative works may be recommended to a service provider 210 based on the recommendation module(s) 242 determining that a score associated with each creative work meets or exceeds a predetermined threshold value of scores. For example, only creative works that receive a 90% information matching (e.g., relevance) score may be recommended to the service provider 210. In some embodiments, this predetermined threshold value may be set and/or modified by the service provider 210.

As described above, filtering of identified service providers 210 and/or creative works may be based on the calculated scores indicating a relevance of the service providers 210 and/or creative works to the rights holder 206 and/or service provider 210, respectively. In this manner, a filtered group of identified service providers 210 and/or creative works determined to be most relevant may be created, and the filtered group may be recommended to the rights holder 206 and/or the service provider 210, respectively.

The recommendation module(s) 242 may further be configured to determine, based on processing a service request and/or various pieces of information described herein, which pieces of information (e.g., metadata, attribute information, and/or the like) are critical (e.g., most relevant and/or relevant) to a rights holder 206 and/or a service provider 210. For example, the recommendation module(s) 242 may determine a piece of metadata associated with a creative work to be critical to a corresponding rights holder 206 based on a weight, a ranking, a location in an order of information (e.g., pieces of metadata and/or attribute information), and/or the like.

The recommendation module(s) 242 may further be configured to generate a recommendation based on determination of service providers 210 and/or creative works to be recommended to the rights holder 206 and/or the service provider 210, respectively. In some embodiments, the recommendation may be included in an email, a message, a push notification, an alert, and/or the like, which may be transmitted from the recommendation module(s) 242 (e.g., the publishing service platform server(s) 202) to the rights holder device 204 and/or the service provider device 208 via the one or more networks 112 for selection by the rights holder 206 and/or the service provider 210, respectively. The recommendation may also include a visual presentation of one or more recommended service providers 210 (e.g., recommended service providers 116 of FIG. 1) and/or creative works (e.g., recommended creative works 126 of FIG. 1) via a dashboard associated with the publishing service platform (e.g., via publishing service platform applications 254, 268) and/or an online marketplace. The recommended service providers 210 and/or creative works may be presented in a list, a grid, and/or the like that is sorted, ranked, and/or ordered based on relevance to the rights holder 206 and/or the service provider 210, respectively. For example, recommended service providers 210 with the highest score (e.g., best-matching) may be presented to the rights holder 206 via the rights holder device 204 first or in a first position in a list. The recommendation may also include justifications for why each service provider and/or creative work was determined to be recommended by the recommendation module(s) 242. The recommendation may further include means for enabling a user (e.g., a rights holder 206 and/or a service provider 210) to provide feedback associated with the provided recommendations. For example, a service provider 210 may be enabled to provide, via the publishing service platform application 268 of the service provider device 208, input that specifies why the service provider 210 chooses to select and/or not select a recommended creative work. In this manner, the recommendation module(s) 242 may update a user profile associated with the service provider 210 and/or attribute information associated with the service provider 210 based on feedback received from the service provider 210). The recommendation typically includes means for enabling a user (e.g., a rights holder 206 and/or a service provider 210) to select one or more recommendations (e.g., a recommended service provider 210 and/or a recommended creative work) using the rights holder device 204 and/or the service provider device 208.

Upon selection of a recommendation by a user (e.g., a rights holder 206 and/or a service provider 210), the recommendation module(s) 242 may initiate a communication link between the user (e.g., a rights holder 206 and/or a service provider 210) and a selected recommendation (e.g., a selected recommended service provider 210 and/or a selected recommended creative work). For example, the recommendation module(s) 242 may initiate a chat window, a conversation stream, a videoconferencing stream, a teleconferencing stream, and/or the like between the rights holder device 204 and the service provider device 208 associated with the selected recommended service provider 210. The two parties may then be enabled to communicate regarding how to perform the service, explain additional details of the service, and/or the like.

In some embodiments, the recommendation module(s) 242 may further include computer-executable instructions that, responsive to execution by one or more of the processor(s) 222, may cause initiation of a transaction process associated with performing the service. For example, the recommendation module(s) 242 may request payment information from the rights holder 206 via the publishing service platform application 254 of the rights holder device 204. In some embodiments, the recommendation module(s) 242 (e.g., publishing service platform server(s) 202) may generate, receive, and/or transmit an invoice prior to establishing a communication link between a rights holder 206 and a service provider 210. In some embodiments, the recommendation module(s) 242 may also determine a currency associated with each of the rights holder and the service provider based on location information associated with the rights holder 206 and/or the service provider 210. In this manner, the recommendation module(s) 242 may facilitate the conversion of one or more currencies so as to ensure a seamless payment process. The recommendation module(s) 242 may further include means for communicating, receiving, transmitting, modifying, retrieving, and/or storing payment information and/or other information with a financial institution server (not pictured) associated with a financial institution, a third party payment processing entity, and/or the like for execution of the transaction.

Referring now to other illustrative components of the publishing service platform server 202, the O/S 232 may be loaded into the memory 224 and may provide an interface between other application software executing on the publishing service platform server 202 and hardware resources of the publishing service platform server 202. More specifically, the O/S 232 may include a set of computer-executable instructions for managing hardware resources of the publishing service platform server 202 and for providing common services to other application programs (e.g., managing memory allocation among various application programs). The O/S 232 may include any operating system now known or which may be developed in the future including, but not limited to, any server operating system, any mainframe operating system, or any other proprietary or non-proprietary operating system.

The DBMS 234 may be loaded into the memory 224 and may support functionality for accessing, retrieving, storing, and/or manipulating data stored in one or more datastores, data stored in the memory 224, and/or data stored in the data storage 230. The DBMS 234 may use any of a variety of database models (e.g., relational model, object model, etc.) and may support any of a variety of query languages.

The processor(s) 222 may be configured to access the memory 224 and execute computer-executable instructions stored therein. For example, the processor(s) 222 may be configured to execute computer-executable instructions of the various program modules of the publishing service platform server 202 to cause or facilitate various operations to be performed in accordance with one or more embodiments of the disclosure. The processor(s) 222 may include any suitable processing unit capable of accepting data as input, processing the input data in accordance with stored computer-executable instructions, and generating output data. The processor(s) 222 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 222 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 222 may be capable of supporting any of a variety of instruction sets.

The publishing service platform server 202 may further include one or more input/output (I/O) interfaces 226 that may facilitate the receipt of input information by the publishing service platform server 202 from one or more I/O devices as well as the output of information from the publishing service platform server 202 to the one or more I/O devices. The I/O devices may include, for example, one or more user interface devices that facilitate interaction between a user and the publishing service platform server 202 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The publishing service platform server 202 may be configured to communicate with any of a variety of other systems, platforms, networks, devices, and so forth (e.g., a rights holder device 204, a service provider device 208, and/or the like) via one or more of the network(s) 212. The publishing service platform server 202 may include one or more network interfaces 228 that may facilitate communication between the publishing service platform server 202 and any of the systems, networks, platforms, devices, or components of the system architecture 200.

Although not explicitly depicted or described, it should be appreciated that a rights holder device 204 may include similar hardware, software, or firmware components and/or additional or alternate hardware, software, or firmware components as those described through reference to the publishing service platform server 202.

It should be appreciated that the program modules, applications, computer-executable instructions, code, or the like depicted in FIG. 2 as being stored in the data storage 230 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the publishing service platform server 202, the rights holder device 204, the service provider device 208, and/or hosted on other computing device(s) accessible via one or more of the network(s) 212 may be provided to support functionality provided by the program modules, applications, or computer-executable code depicted in FIG. 2 and/or additional or alternate functionality. Further, functionality may be modularized differently such that processing described as being supported collectively by the collection of program modules depicted in FIG. 2 may be performed by a fewer or greater number of modules, or functionality described as being supported by any particular module may be supported, at least in part, by another module. In addition, program modules that support the functionality described herein may form part of one or more applications executable across any number of systems or devices of the system architecture 200 in accordance with any suitable computing model such as, for example, a client-server model, a peer-to-peer model, and so forth. In addition, any of the functionality described as being supported by any of the program modules depicted in FIG. 2 may be implemented, at least partially, in hardware and/or firmware across any number of devices.

It should further be appreciated that the publishing service platform server 202, the rights holder device 204, the service provider device 208, and/or any other illustrative component of the system architecture 200 may include alternate and/or additional hardware, software, or firmware components beyond those described or depicted without departing from the scope of the disclosure. More particularly, it should be appreciated that software, firmware, or hardware components depicted as forming part of any entity included in the architecture 200 are merely illustrative and that some components may not be present or additional components may be provided in various embodiments. While various illustrative program modules have been depicted as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Exemplary User Interfaces

Figure 3:
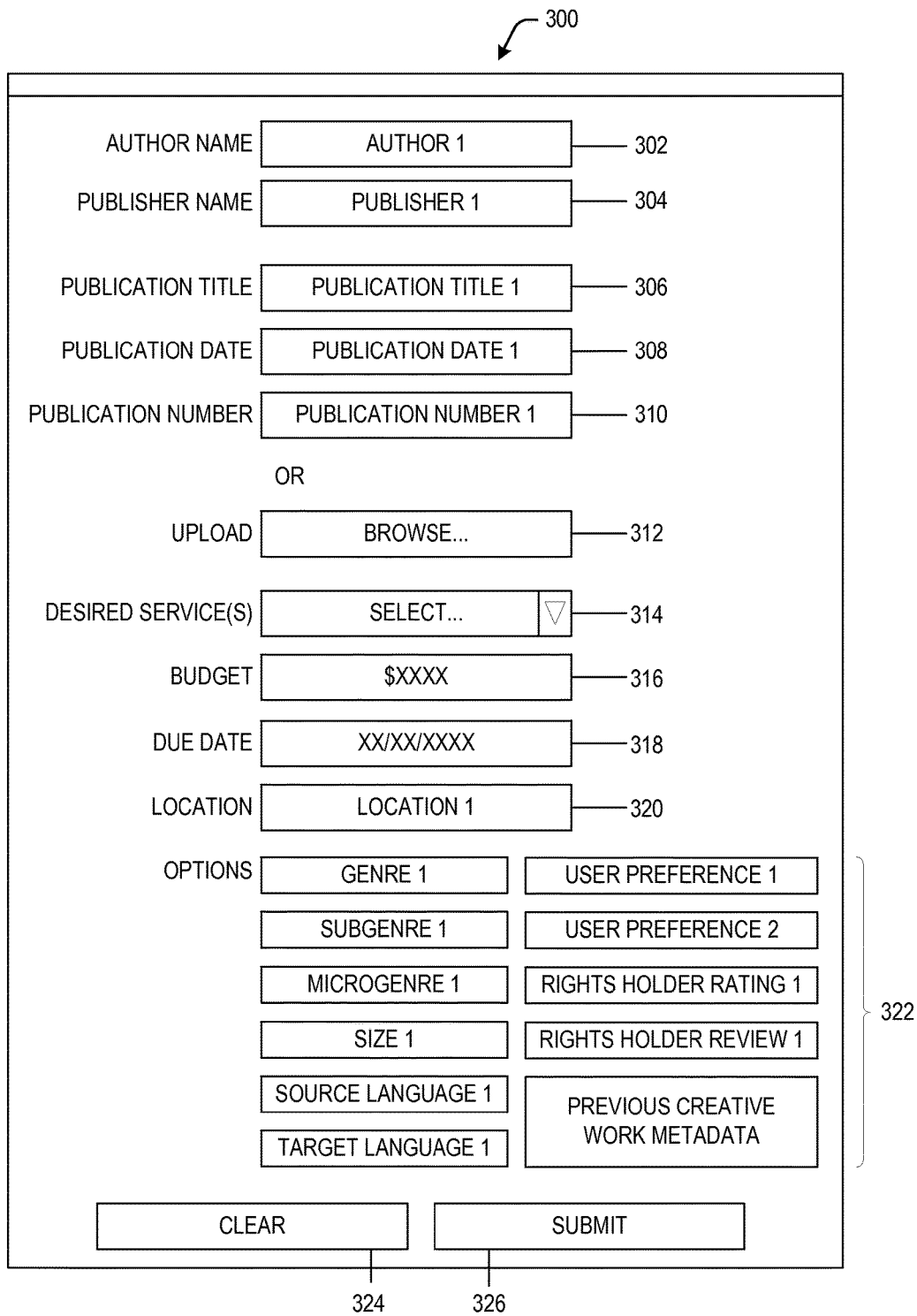
FIG. 3 is an illustrative user interface via which a rights holder may generate a service request in accordance with one or more example embodiments of the disclosure.

FIG. 3 is an illustrative user interface 300 for enabling a rights holder to generate a service request in accordance with one or more example embodiments of the disclosure. In some embodiments, the rights holder is enabled to input an author name 302, a publisher name 304, a publication title 306, a publication date 308, and/or a publication number 310 (e.g., serial number, product number, and/or the like) associated with a creative work. By providing this information and/or based on this information, the publishing service platform may identify the creative work. For example, the publishing service platform may search an online marketplace for a creative work with a similar title, publisher, author, publication number, and/or the like. Alternatively, the rights holder may be enabled to upload 312 a creative work. For example, the rights holder may upload a word document of an unpublished novel and/or its creation is still in progress. In some embodiments, this information (e.g., metadata) is automatically retrieved and/or populated by the publishing service platform according to processes described herein.

Once the creative work is identified and/or uploaded, the publishing service platform may analyze the content of the creative work. In this manner, the publishing service platform may identify one or more services 314 to be performed to the creative work. Alternatively, the rights holder may select one or more services 314. The publishing service platform may also determine an amount of time required to perform any desired service(s). The rights holder may then input and/or select a budget 316 and/or a due date 318 of the desired service(s) to be performed.

The rights holder may then input and/or select a location 320. In some embodiments, the publishing service platform may determine a location 320 associated with the rights holder according to processes described herein.

The rights holder may then be enabled to input various options 322 associated with the creative work and/or the service request. For example, the rights holder may specify a source language and a target language for a desired translation service. Additionally and/or alternatively, the publishing service platform may automatically retrieve various pieces of information (e.g., metadata associated with the creative work, historical information associated with the rights holder, attribute information, and/or the like) associated with the creative work and/or the rights holder. For example, the publishing service platform may determine and/or populate various options 322 associated with the creative work and/or the rights holder such as a genre, a subgenre, a microgenre, a file size, a word count, a page length, a source language, a target language, user preferences, attribute information, ratings and/or reviews, information and/or metadata associated with a previous creative work, and/or the like. In some embodiments, the publishing service platform may determine options 322 based on an analysis of the creative work (e.g., content of the creative work), such as a word processing analysis, an image analysis, and/or similar analysis of content. In some embodiments, options 322 may be determined by the publishing service platform based on a selected desired service 314. For example, if a translation service is requested, the publishing service platform may analyze content of the creative work to determine a source language (e.g., a language in which the creative work is written and/or published). The rights holder may further be enabled to filter, modify, sort, remove, rank, add, and/or weight various options 322.

The rights holder may clear 324 any inputs provided to the user interface 300 and/or submit 326 the inputted and/or retrieved information for generation of a corresponding service request. As such, a service request may be generated based on the information included in the user interface 300. Further, this and/or additional information may be utilized to generate and/or update a user profile associated with the rights holder. The publishing service platform may then process the service request and/or provided information according to the processes disclosed herein.

Figure 4:
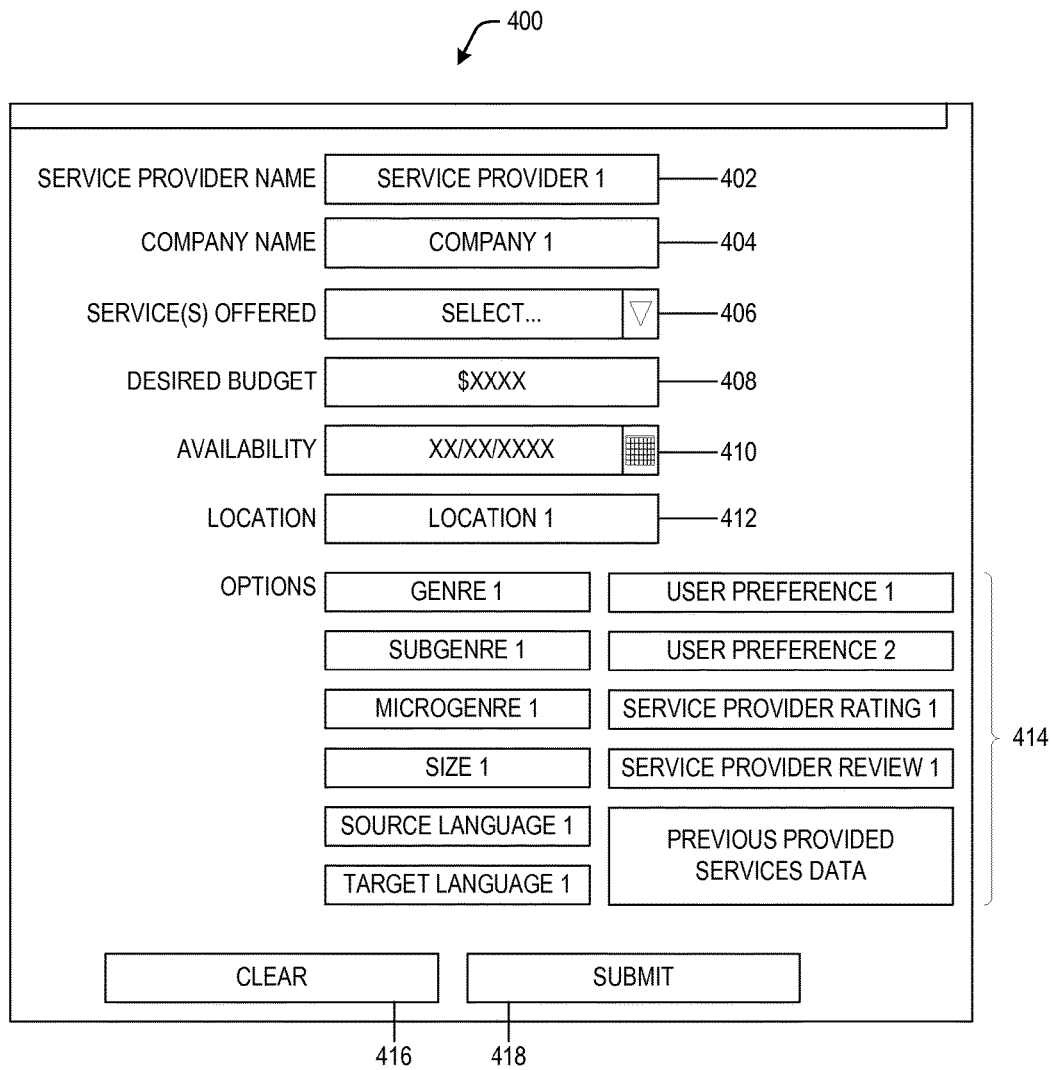
FIG. 4 is an illustrative user interface that enables a service provider to specify publishing service parameters in accordance with one or more example embodiments of the disclosure.

FIG. 4 is an illustrative user interface 400 for enabling a service provider to provide publishing service parameters and/or attribute information in accordance with one or more example embodiments of the disclosure. In some embodiments, the service provider is enabled to input a service provider name 402, a company name 404, and/or the like. The publishing service platform may also retrieve this information according to processes disclosed herein.

The service provider may then input and/or select one or more services 406 that are offered by the service provider for a creative work. For example, the service provider may select a translation service. The rights holder may then input and/or select a desired budget 408 and/or budget range associated with performing a service to a creative work, as well as an availability 410 to perform the services.

The service provider may then input and/or select a location 412. In some embodiments, the publishing service platform may determine a location 412 associated with the service provider according to processes described herein.

The service provider may then be enabled to input various options 414 associated with the creative work. For example, the service provider may specify a source language and a target language for an offered translation service. Additionally and/or alternatively, the publishing service platform may automatically retrieve various pieces of information (e.g., metadata and/or historical information associated with the previously-performed services and/or the service provider, attribute information, and/or the like) associated with the service provider. For example, the publishing service platform may determine and/or populate various options 414 associated with previously-performed services and/or the service provider such as a genre, a subgenre, a microgenre, a file size, a word count, a page length, a source language, a target language, user preferences, attribute information, ratings and/or reviews, information and/or metadata associated with a previously-performed service, and/or the like. In some embodiments, the publishing service platform may determine options 414 based on an analysis of a previously-performed service such as a word processing analysis, an image analysis, and/or similar analysis of content. In some embodiments, options 414 may be determined by the publishing service platform based on a selected service offered 406. For example, if a translation service is offered, the publishing service platform may determine one or more languages in which the service provider is proficient based at least in part on an analysis of a user profile of the service provider, an analysis of previously-performed translation services, and/or the like. The service provider may further be enabled to filter, modify, sort, remove, rank, add, and/or weight various options 414.

The service provider may clear 416 any inputs provided to the user interface 400 and/or submit 418 the inputted and/or retrieved information for generation of a corresponding creative work request. In some embodiments, the information inputted by the service provider and/or retrieved by the publishing service platform (e.g., the information included in the user interface 400) may be utilized to generate a creative work request, generate and/or update a user profile associated with the service provider, and/or the like. The publishing service platform may then process the creative work request and/or provided information according to the processes disclosed herein.

Figure 5:
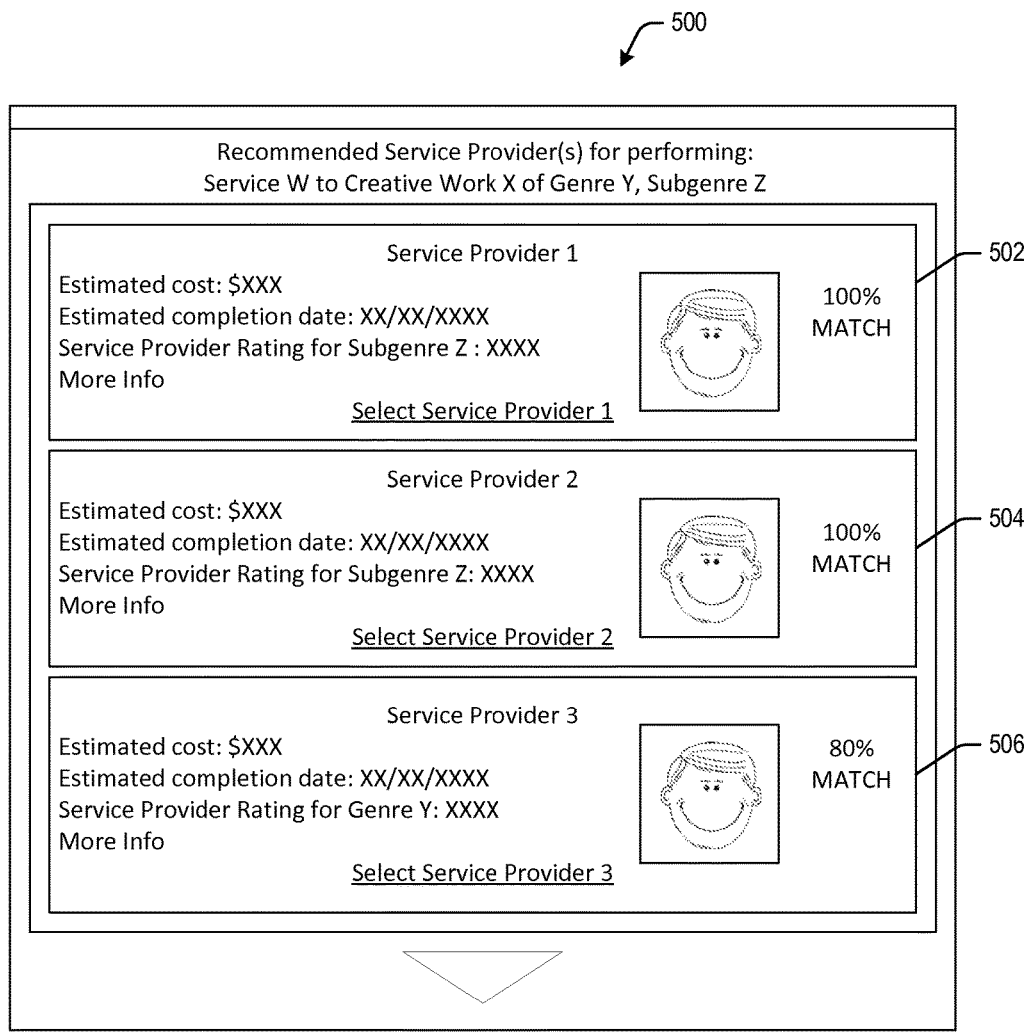
FIG. 5 is an illustrative user interface for presenting information identifying candidate service providers for providing a publishing service to a rights holder in accordance with one or more example embodiments of the disclosure.

FIG. 5 illustrates an exemplary user interface 500 for presenting recommended service providers to the rights holder. In accordance with embodiments disclosed herein, one or more service providers may be recommended to the rights holder for performing a desired service to a creative work as specified in a service request. Service provider recommendations 502, 504, 506 may include information associated with the recommended service providers such as an estimated cost of completion, estimated date and/or time of completion of the desired service, ratings, reviews, and/or contact information associated with the service provider, means for selecting the service provider, and/or the like. Other information associated with each service provider may also be included and/or be accessible to the rights holder from the user interface 500 such as location information, consumption data, and/or the like. Further, a calculated score indicating how well each service provider matches criteria set forth in the service request generated by the rights holder may also be included in the service provider recommendations 502, 504, 506. Based on the calculated score, the service provider recommendations 502, 504, 506 may be ranked in an order that provides a best-fitting service provider first. In this manner, the rights holder may be enabled to select a recommended service provider for performing a desired service to a creative work.

For example, a rights holder may generate a service request for a language translation service (e.g., Service W) to be performed to a romance (e.g., Genre X) novel (e.g., Creative Work Y) from the nineteenth century (e.g., Subgenre Z). The rights holder may specify in the service request a source language and/or a target language, various pieces of metadata, consumption information, location information, user information, content of the creative work, and/or the like. In other embodiments, this information may be automatically retrieved from a database (e.g., database 238 of FIG. 2) associated with an online marketplace, determined by the publishing service platform, and/or the like.

This information included in and/or associated with the service request may be compared with attribute information (e.g., user information, consumption information, location information, preferences, and/or the like) of one or more service providers. In some embodiments, one or more pieces of metadata may match one or more pieces of attribute information of a service provider. For example, Service Provider 1, Service Provider 2, and Service Provider 3 may all be located within a predetermined proximity to the rights holder who generated the service request. Alternatively and/or additionally, Service Provider 1, Service Provider 2, and Service Provider 3 may each have experience with language translation services from a source language to a target language specified in the service request.

Based on how many pieces of metadata and/or attribute information match, as well as how they are weighted by the rights holder and/or the service providers, respectively, a score may be calculated for each service provider. In some embodiments, the score may be indicative of how relevant the service provider may be to the rights holder. For example, Service Providers 1 and 2, as indicated by their ratings for performing services to creative works under Subgenre Z, may be more relevant (and therefore may have higher calculated scores of 100%) than Service Provider 3, who does not have documented experience (e.g., ratings) associated with performing services to creative works under Subgenre Z (and therefore may have a lower calculated score of 80%). Instead, Service Provider 3 may only have experience with broader Genre Y. Therefore, since Service Providers 1 and 2 have experience with a more precise subgenre (e.g., Subgenre Z), then they may be determined to be more relevant and may be awarded a higher score (100%).

As described herein, in some embodiments, the estimated completion date of a desired service to be performed to the creative work may be based on a service provider's availability, prior work experience, previous services provided to creative works, a number of pending, scheduled, and/or completed services, a number of employees of the service provider, a project scope and/or size associated with the desired service and/or metadata associated with a creative work specified in the service request, and/or the like. For example, an amount of time to complete a translation service to a creative work of 100 words may be determined based on an amount of time required to complete one or more previously-performed translation services of a similar creative work size, scope, language(s), and/or the like. These pieces of information, as well as other attribute information associated with the service provider and/or the rights holder, may be utilized by the publishing service platform to calculate the calculated scores of each service provider recommendation 502, 504, 506.

Note that a second user interface similar to the user interface 500 may be presented to a service provider for recommendations of creative works. However, instead of an estimated completion date, the second user interface may include a service due date that corresponds to a date by which a service must be performed to a creative work (as indicated by information included in a service request). In this manner, the service provider may be enabled to select one or more creative works to which a service is to be performed.

Illustrative Processes

Figure 6:
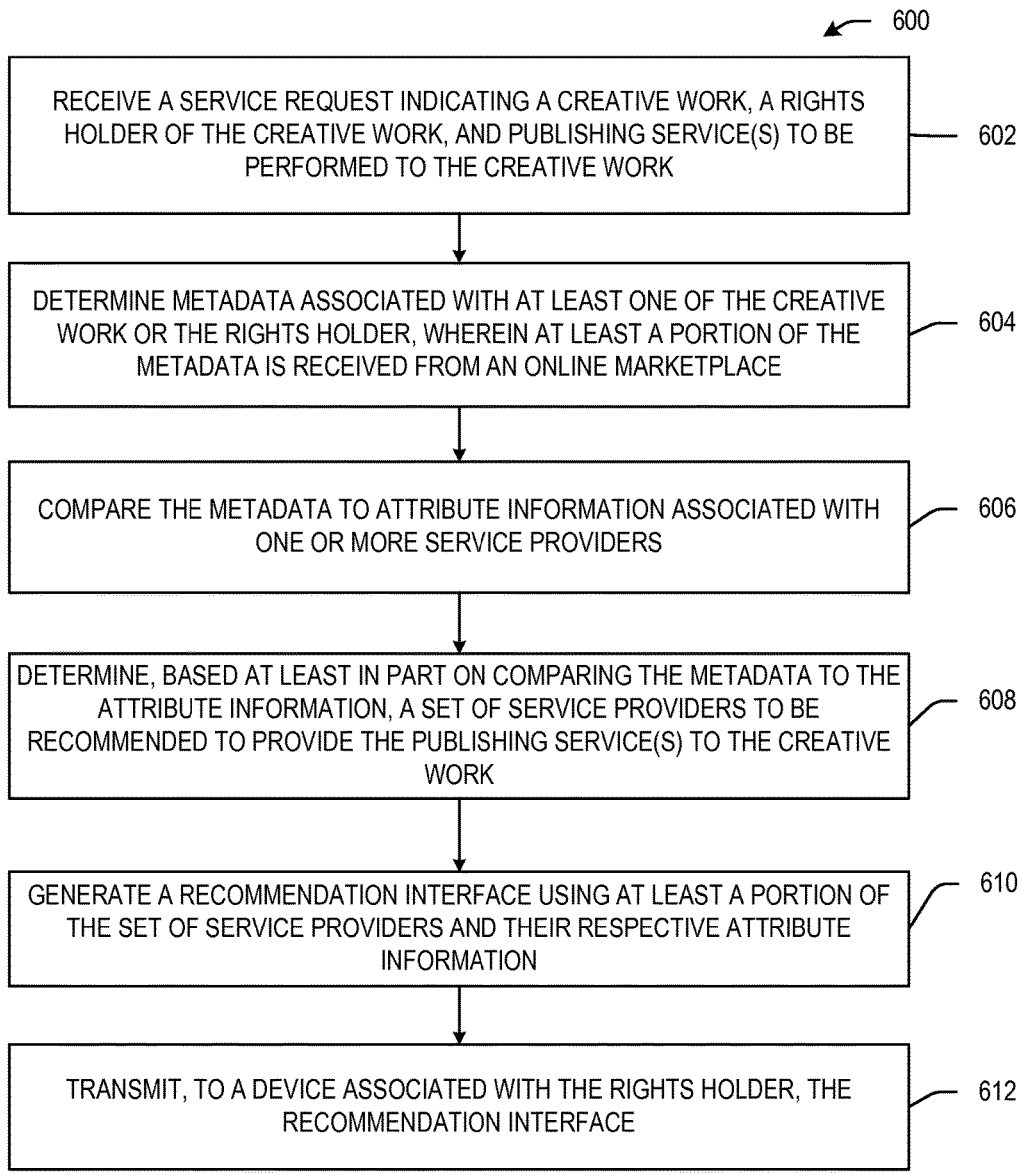
FIG. 6 is a process flow diagram of an illustrative method for determining a service provider recommendation to be transmitted to a rights holder in accordance with one or more example embodiments of the disclosure.

FIG. 6 is a process flow diagram of an illustrative method 600 for determining a recommended service provider to be transmitted to a rights holder in accordance with one or more example embodiments of the disclosure. At block 602, the method 600 includes receiving a service request indicating a creative work, a rights holder of the creative work, and publishing service(s) to be performed to the creative work. At block 604, the method 600 includes determining metadata associated with at least one of the creative work or the rights holder, wherein at least a portion of the metadata is received from an online marketplace. At block 606, the process includes comparing the metadata to attribute information associated with one or more service providers. At block 608, the method 600 includes determining, based at least in part on comparing the metadata to the attribute information, a set of service providers to be recommended to perform the publishing service(s) to the creative work. At block 610, the method 600 includes generating a recommendation interface using at least a portion of the set of service providers and their respective attribute information. At block 612, the method 600 includes transmitting, to a device associated with the rights holder, the recommendation interface.

Figure 7:
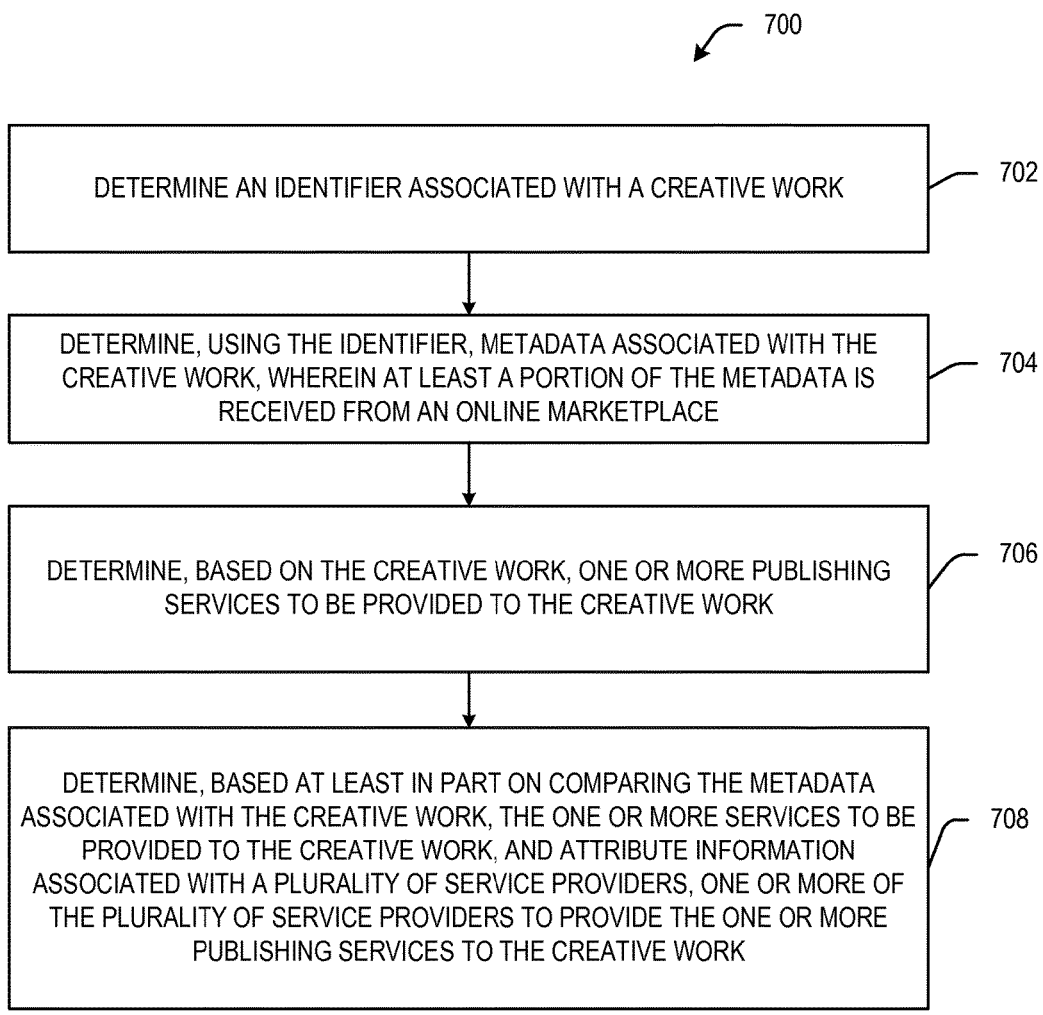
FIG. 7 is a process flow diagram of an illustrative method for identifying one or more publishing services to be performed to a creative work in accordance with one or more example embodiments of the disclosure.

FIG. 7 is a process flow diagram of an illustrative method 700 for identifying one or more publishing services to be performed to a creative work. At block 702, the method 700 includes determining an identifier associated with a creative work. At block 704, the method 700 includes determining, using the identifier, metadata associated with the creative work, wherein at least a portion of the metadata is received from an online marketplace. At block 706, the method 700 includes determining, based on the creative work, one or more publishing services to be performed to the creative work. At block 708, the method 700 includes determining, based at least in part on comparing the metadata associated with the creative work, the one or more services to be performed to the creative work, and attribute information associated with a plurality of service providers, one or more of the plurality of service providers to perform the one or more services to the creative work.

One or more operations of the methods 600, 700 may have been described above as being performed by the publishing service platform server 202, or more specifically, by one or more program modules, applications, or the like executing on the publishing service platform server 202. It should be appreciated, however, that any of the operations of methods 600, 700 may be performed by another device or component of the system architecture 200 or a device or component of another implementation of the architecture 100. In addition, it should be appreciated that processing performed in response to execution of computer-executable instructions provided as part of an application, program module, or the like may be interchangeably described herein as being performed by the application or the program module itself, by a device on which the application, program module, or the like is executing, or by a system that includes such a device. While the operations of the methods 600, 700 may have been described in the context of the illustrative system architecture 200, it should be appreciated that such methods may be implemented in connection with numerous other architectural and device level configurations.

In addition, the operations described and depicted in the illustrative methods of FIGS. 6-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 6-7 may be performed. For example, any method performed for recommending service providers to rights holders may similarly be utilized for recommending creative works to service providers, and vice versa.

CONCLUSIONS

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionality may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system, comprising:
   at least one processor;
   at least one memory storing computer-executable instructions, that when executed by the at least one processor, cause the at least one processor to:
   receive a service request that indicates a publishing service to be provided to a creative work;
   determine metadata corresponding to the creative work, wherein the metadata represents a genre associated with the creative work;
   determine a candidate service provider to provide the publishing service to the creative work based at least in part on the metadata and attribute information associated with the candidate service provider;
   identify one or more predetermined keywords comprised in text of the creative work;
   determine a subgenre of the creative work using the one or more predetermined keywords;
   determine a second publishing service to be provided to the creative work by the candidate service provider; and
   send data to a user device, wherein the data represents the candidate service provider, and comprises a recommendation for the candidate service provider to provide the second publishing service to the creative work.

2. The system of claim 1, wherein the creative work is a first creative work, wherein the publishing service comprises at least one of a translation service, an illustration service, a proofreading service, or an editing service, wherein the service request is received from the user device, which is associated with a rights holder of the creative work, wherein the rights holder is at least one of an author, a publisher, a manager, or an agent, and wherein the computer-executable instructions further cause the at least one processor to:
   receive the attribute information associated with the candidate service provider, wherein the attribute information associated with the candidate service provider comprises historical information associated with the candidate service provider providing the publishing service to one or more second creative works associated with the genre.

3. The system of claim 2, wherein the computer-executable instructions further cause the at least one processor to:
   determine a rights holder location of a first device associated with the rights holder;
   determine a service provider location of a second device associated with the candidate service provider; and
   determine the data representing the candidate service provider is to comprise the presentation of the candidate service provider to provide the publishing service based at least in part on determining the second device associated with the candidate service provider is within a geographic proximity to the first device associated with the rights holder.

4. The system of claim 1, wherein the computer-executable instructions to determine metadata further cause the at least one processor to:
   receive at least a portion of the metadata from an online marketplace datastore, wherein the portion of the metadata received from the online marketplace datastore comprises consumption information associated with one or more second creative works associated with a rights holder of the creative work.

5. The system of claim 1, wherein the computer-executable instructions further cause the at least one processor to:
   determine an amount of time required for the candidate service provider to provide the publishing service to the creative work based at least in part on the metadata and historical information, wherein the historical information includes an amount of time the candidate service provider took to provide the publishing service to a second creative work.

6. The system of claim 1, wherein the computer-executable instructions further cause the at least one processor to:
   receive a portion of the attribute information from an online marketplace datastore, wherein the portion of the attribute information received from the online marketplace datastore comprises consumption information associated with one or more second creative works associated with the candidate service provider.

7. The system of claim 1, wherein the computer-executable instructions further cause the at least one processor to:
   determine a first set of candidate service providers that provide the publishing service using a first comparison of the metadata to respective attribute information associated with a plurality of candidate service providers, wherein the first set of candidate service providers is a first subset of the plurality of candidate service providers;
   determine a modified portion of the metadata to result in modified metadata, wherein the modified portion is determined using an association of the creative work or a rights holder of the creative work with a type of creative work or a type of rights holder, respectively; and
   determine a second set of candidate service providers that provide the publishing service using a second comparison of the modified metadata to attribute information associated with the second set of candidate service providers, wherein the second set of candidate service providers is a second subset of the first set of candidate service providers, and wherein the candidate service provider is determined from the second set of candidate service providers.

8. A method, comprising:
receiving, by a computing device processor, a service request that indicates a publishing service to be provided to a creative work;
determining, by the computing device processor, metadata corresponding to the creative work, wherein the metadata represents a genre associated with the creative work;
determining, by the computing device processor, a candidate service provider to provide the publishing service to the creative work based at least in part on the metadata and attribute information associated with the candidate service provider;
identifying, by the computing device processor, one or more predetermined keywords comprised in text of the creative work;
determining, by the computing device processor, a sub-genre of the creative work using the one or more predetermined keywords;
determining, by the computing device processor, a second publishing service to be provided to the creative work by the candidate service provider; and
sending, by the computing device processor, data to a user device, wherein the data represents the candidate service provider, and comprises a recommendation for the candidate service provider to provide the second publishing service to the creative work.

9. The method of claim 8, wherein the creative work is a first creative work, wherein the publishing service comprises at least one of a translation service, an illustration service, a proofreading service, or an editing service, wherein the service request is received from the user device, which is associated with a rights holder of the creative work, wherein the rights holder is at least one of an author, a publisher, a manager, or an agent, and further comprising:
receiving, by the computing device processor, the attribute information associated with the candidate service provider, wherein the attribute information associated with the candidate service provider comprises historical information associated with the candidate service provider providing the publishing service to one or more second creative works associated with the genre.

10. The method of claim 9, further comprising:
determining, by the computing device processor, a rights holder location of a first device associated with the rights holder;
determining, by the computing device processor, a service provider location of a second device associated with the candidate service provider;
determining, by the computing device processor, the data representing the candidate service provider is to comprise the presentation of the candidate service provider to provide the publishing service based at least in part on determining the second device associated with the candidate service provider is within a geographic proximity to the first device associated with the rights holder.

11. The method of claim 8, wherein determining metadata further comprises:
receiving, by the computing device processor, at least a portion of the metadata from an online marketplace datastore, wherein the portion of the metadata received from the online marketplace datastore comprises consumption information associated with one or more second creative works associated with a rights holder of the creative work.

12. The method of claim 8, further comprising:
determining, by the computing device processor, an amount of time required for the candidate service provider to provide the publishing service to the creative work based at least in part on the metadata and historical information, wherein the historical information includes an amount of time the candidate service provider took to provide the publishing service to a second creative work.

13. The method of claim 8, further comprising:
receiving, by the computing device processor, at least a portion of the attribute information from an online marketplace datastore, wherein the portion of the attribute information received from the online marketplace datastore comprises consumption information associated with one or more second creative works associated with the candidate service provider.

14. The method of claim 8, further comprising:
determining, by the computing device processor, a first set of candidate service providers that provide the publishing service using a first comparison of the metadata to respective attribute information associated with a plurality of candidate service providers, wherein the first set of candidate service providers is a first subset of the plurality of candidate service providers;
determining, by the computing device processor, a modified portion of the metadata to result in modified metadata, wherein the modified portion is determined using an association of the creative work or a rights holder of the creative work with a type of creative work or a type of rights holder, respectively; and
determining, by the computing device processor, a second set of candidate service providers that provide the publishing service using a second comparison of the modified metadata to attribute information associated with the second set of candidate service providers, wherein the second set of candidate service providers is a second subset of the first set of candidate service providers, and wherein the candidate service provider is determined from the second set of candidate service providers.

15. The system of claim 1, wherein the computer-executable instructions to send data further cause the at least one processor to:
send a user interface comprising the data representing the candidate service provider to the user device.

16. The system of claim 1, wherein the metadata includes a word count and a source language of the creative work.

17. The system of claim 1, wherein the data representing the candidate service provider includes a cost for the candidate service provider to provide the publishing service to the creative work.

18. The system of claim 1, wherein the data representing the candidate service provider includes at least one of a rating, a review, or contact information associated with the candidate service provider.

* * * * *